US011085811B2

(12) United States Patent
Polomski

(10) Patent No.: US 11,085,811 B2
(45) Date of Patent: Aug. 10, 2021

(54) DEVICE AND METHOD FOR WEIGHING A PRODUCT IN A WEIGHING SECTION THAT INCLUDES A CONVEYING DEVICE FOR TRANSPORTING THE PRODUCT IN A DIRECTION FROM A START POSITION OVER THE WEIGHING SECTION TO A DESTINATION POSITION AND A CONTROL DEVICE CONFIGURED TO AUTOMATICALLY STOP THE CONVEYING DEVICE DURING ITS OPERATION TO ACHIEVE A STOPPED STATE AND THEN TO AUTOMATICALLY OPERATE THE CONVEYING DEVICE IN A REVERSE MOVEMENT DIRECTION UNTIL THE PRODUCT IS NO LONGER LOCATED IN THE WEIGHING SECTION

(71) Applicant: ESPERA-WERKE GmbH, Duisburg (DE)

(72) Inventor: Jürgen Polomski, Duisburg (DE)

(73) Assignee: Espera-Werke GmbH, Duisburg (DE)

(*) Notice: Subject to any disclaimer, the term of this patent is extended or adjusted under 35 U.S.C. 154(b) by 197 days.

(21) Appl. No.: 16/335,321

(22) PCT Filed: Jun. 20, 2017

(86) PCT No.: PCT/EP2017/065079
§ 371 (c)(1),
(2) Date: Mar. 21, 2019

(87) PCT Pub. No.: WO2018/054563
PCT Pub. Date: Mar. 29, 2018

(65) Prior Publication Data
US 2019/0212184 A1 Jul. 11, 2019

(30) Foreign Application Priority Data
Sep. 23, 2016 (DE) .................... 10 2016 117 966.3

(51) Int. Cl.
*G01G 15/00* (2006.01)
*G01G 19/414* (2006.01)
(Continued)

(52) U.S. Cl.
CPC ......... *G01G 19/393* (2013.01); *G01G 15/006* (2013.01); *G01G 19/387* (2013.01); *G01G 19/4148* (2013.01); *G01G 23/06* (2013.01)

(58) Field of Classification Search
CPC .. G01G 19/4148; G01G 23/06; G01G 19/387; G01G 19/393; G01G 15/006
(Continued)

(56) References Cited

U.S. PATENT DOCUMENTS 5,230,391 A * 7/1993 Murata ................. G01G 11/00
177/145
6,559,391 B2 * 5/2003 Huebler ............... G01G 19/005
177/121
(Continued)

FOREIGN PATENT DOCUMENTS

CN 103328941 A 9/2013
CN 204751428 U 11/2015
(Continued)

OTHER PUBLICATIONS

Sensotec Weigher, Cehcotek 2015, Sensotec Sensing & Control (Russia); Cited in a parallel Eurasian Office Action dated Jul. 6, 2020.
(Continued)

*Primary Examiner* — Randy W Gibson
(74) *Attorney, Agent, or Firm* — Rankin, Hill & Clark LLP

(57) ABSTRACT

The present invention relates to a weighing device (1), in particular price labelling device or checkweigher, having a scale for weighing a product in a weighing section ($A_W$),
(Continued)

Figure 1:
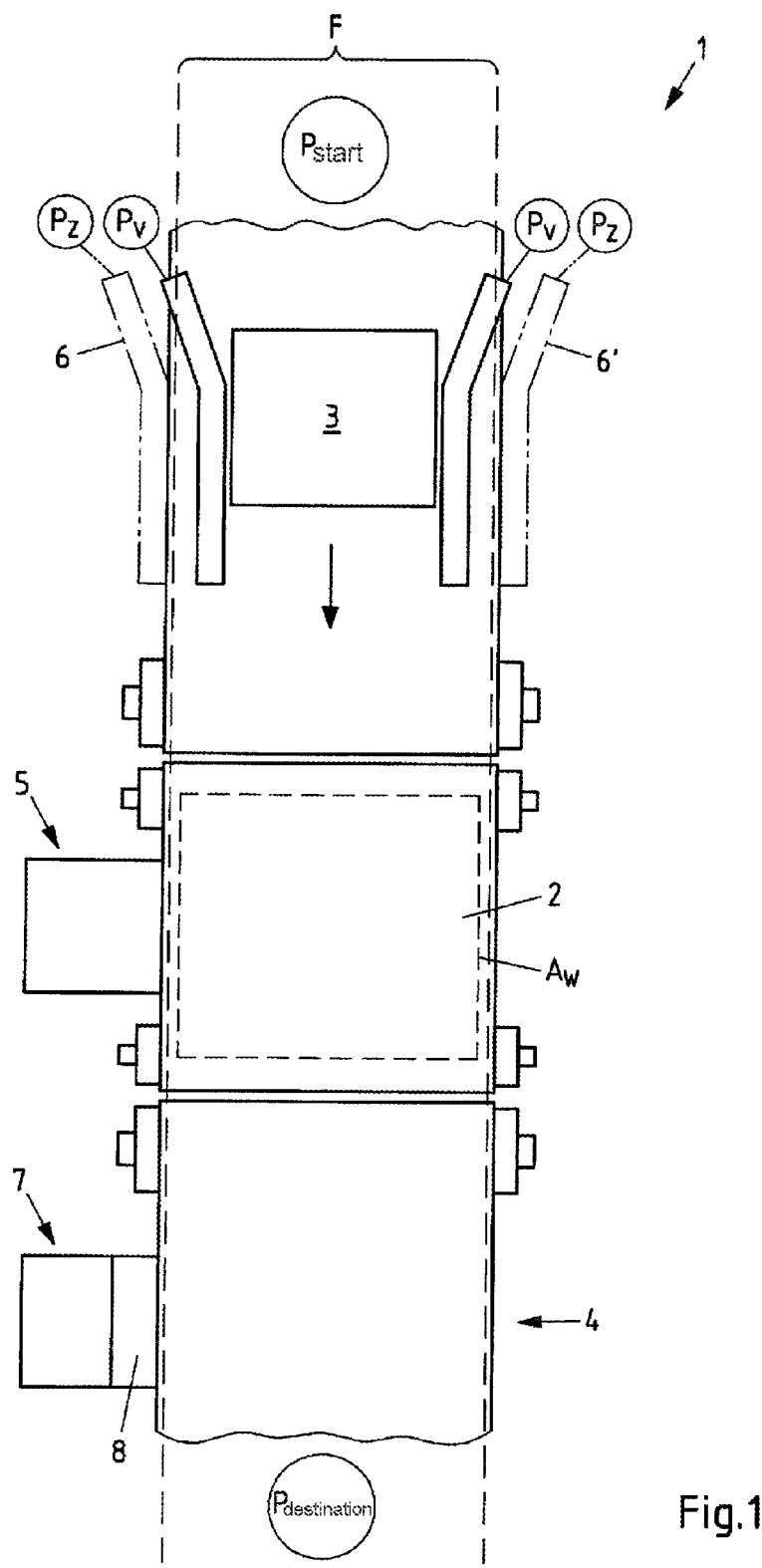

having a conveying device (4) for transporting the product (3) along a conveying region (F) from a start position ($P_{start}$) over the weighing section ($A_W$) to a destination position ($P_{destination}$). To simplify a calibration to compensate for a static-dynamic offset, the invention proposes that the weighing device (1) further has a control device (5) which is configured such that the conveying device (4) can be automatically stopped during its operation in a direction from the start position ($P_{start}$) to the destination position ($P_{destination}$) and then can be automatically operated in a direction from the destination position ($P_{destination}$) to the start position ($P_{start}$). Furthermore, the invention relates to a corresponding method for weighing a product (3).

18 Claims, 3 Drawing Sheets

(51) Int. Cl.
    *G01G 19/387*    (2006.01)
    *G01G 23/06*     (2006.01)
    *G01G 19/393*    (2006.01)
(58) Field of Classification Search
    USPC ................................................. 177/25.15
    See application file for complete search history.

(56) References Cited

U.S. PATENT DOCUMENTS

| | | | |
|---|---|---|---|
| 6,630,632 B2 * | 10/2003 | Huebler | G01G 19/005 |
| | | | 177/25.15 |
| 7,247,801 B2 * | 7/2007 | Salazar | G01G 19/005 |
| | | | 177/1 |
| 8,698,012 B2 * | 4/2014 | Huebler | G01G 19/4148 |
| | | | 177/25.15 |
| 2014/0027186 A1 | 1/2014 | Kawashima | |

FOREIGN PATENT DOCUMENTS

| | | |
|---|---|---|
| DE | 3206061 C1 | 5/1983 |
| DE | 102010005931 A1 | 7/2011 |
| EP | 2574887 A2 | 4/2013 |
| EP | 2669643 A1 | 12/2013 |
| WO | 2004102135 A1 | 11/2004 |

OTHER PUBLICATIONS

International Search Report dated Aug. 8, 2017 filed in PCT/EP2017/065079.

* cited by examiner

DEVICE AND METHOD FOR WEIGHING A PRODUCT IN A WEIGHING SECTION THAT INCLUDES A CONVEYING DEVICE FOR TRANSPORTING THE PRODUCT IN A DIRECTION FROM A START POSITION OVER THE WEIGHING SECTION TO A DESTINATION POSITION AND A CONTROL DEVICE CONFIGURED TO AUTOMATICALLY STOP THE CONVEYING DEVICE DURING ITS OPERATION TO ACHIEVE A STOPPED STATE AND THEN TO AUTOMATICALLY OPERATE THE CONVEYING DEVICE IN A REVERSE MOVEMENT DIRECTION UNTIL THE PRODUCT IS NO LONGER LOCATED IN THE WEIGHING SECTION

The present invention relates to a weighing device, in particular checkweigher or price labelling device, having a scale for weighing a product in a weighing section, having a conveying device for transporting the product along a conveying region from a start position over the weighing section to a destination position.

Furthermore, the invention relates to a method for weighing a product, in particular using a weighing device as defined above.

Different weighing devices are known from the prior art, which are used, for example, as a price labelling device or checkweigher. Weighing devices of this type have a conveying device, often a one- or multi-part conveyor belt, on which products can be transported between a start position and a destination position. The respective product is then weighed between the start position and the destination position, with a price labeller for determining the weight for the purpose of subsequent labelling or with a checkweigher for checking the weight.

The scale is located in a section of the conveyor belt over which the product is conveyed away at a predetermined transport speed. The product is thus weighed in the said weighing devices not at a standstill, that is, statically, but during its movement, that is, dynamically.

A known problem with weighing devices of this type is that the measured values of the same product with static weighing differ from those with dynamic weighing (static-dynamic offset). Among other things, the measurement differences result from the air resistance of the moving product, which may result in a slight lift of the product, thus making the product "lighter". A further reason for measurement differences is that the transport belt, in the section in which the product is weighed, may yield somewhat due to the weight of the product, which causes the product to accelerate in the direction of gravity. Even unevenness in the transport belt can accelerate the product in the direction of gravity. Consequently, with a static weighing, the measured values always differ by a certain value from those with a dynamic weighing.

In order to compensate for the static-dynamic offset in a weighing device of the type mentioned above, it is known to determine a correction value by which a test material is first weighed statically and then weighed dynamically several times in succession. A mean value is then formed from the measured values of the multiple dynamic weighing processes. This mean value is then deducted from the measured value determined with the same test material from the static weighing process, resulting in a correction value. If products are now weighed dynamically on the weighing device in regular operation, the previously determined correction value is automatically added to the respective measured value by a control device, thereby determining the actual weight of the product relatively accurately. A weighing device which operates according to the above-described functional principle is known, for example, from DE 32 06 061 C1.

A disadvantage of the prior art, however, is that in the calibration described above to compensate for the static-dynamic offset, a dynamic measurement may be subject to fluctuations, which must therefore be performed several times to determine a mean value. For this purpose, however, the test material must be manually removed by an operator from the transport belt after each dynamic weighing process and then put back in the start position on the transport belt. This is relatively cumbersome, relatively time consuming, in particular when a variety of dynamic measurements are to be performed, and always requires the presence and attention of an operator.

It is therefore an object of the present invention to further develop a weighing device of the type mentioned above such that a calibration to compensate for a static-dynamic offset is simplified. It is also the object of the invention to specify a corresponding method for weighing a product.

The previously derived and indicated object is achieved according to a first teaching of the present invention with a weighing device, in particular price labelling device or checkweigher, having a scale for weighing a product in a weighing section, having a conveying device for transporting the product, wherein the product in particular rests on the conveying device, along a conveying region (that is, transport region) from a start position over the weighing section to a destination position, in that the weighing device further has a control device configured such that the conveying device can be automatically stopped during its operation in a direction from the start position to the destination position and then can be automatically operated in a direction from the destination position to the start position. The conveying region means the region of the conveying device which is available for the transport of a product in which a product can thus be transported.

By providing a control device according to the invention which can automatically stop the moving conveying device and then automatically reverse the movement direction, it becomes possible for a product placed on the conveying device (which is also understood to mean a test material) to first be able to be conveyed from the start position in the direction of the destination position, to be able to be weighed in a region between the start position and the destination position and, after the weighing, to be able to be automatically conveyed back again in the direction to the start position by said movement direction reversal. Said weighing section is provided in the region between the start position and the destination position, which weighing section is a section of the conveying region in which the product can be weighed. In this way, a product or test material can be automatically weighed several times, without the need for an operator to take this from the conveying device multiple times and to place it on this at the start position again.

In the following, various embodiments of the weighing device according to the invention are now described, which are also the subject of the dependent claims.

Thus, according to one embodiment of the weighing device according to the invention, it is provided that the control device is configured such that a weighing process can be performed automatically by means of the scale in a first work step sequence during operation of the conveying device in the direction from the start position to the destination position. This is a dynamic weighing process since the conveying device and thus also the product moves during this weighing process.

Further, it can be provided that the control device is configured such that in a second (alternative) work step sequence that follows or precedes the first work step sequence, a weighing process can be performed by means of the scale in the stopped state of the conveying device automatically after the end of the operation (movement) of the conveying device in the direction from the start position to the destination position, wherein in particular the conveying device can then be operated automatically in the direction from the destination position to the start position. In this case, the conveying device and thus also the product stand still during the weighing process, whereby a static weighing process is performed.

Ideally, both work step sequences are performed one after the other, which takes place in particular automatically (without intervention by an operator). It does not matter whether the first work step sequence is performed before or after the other work step sequence. All that is essential is that from each work step sequence, a measured value or mean value is formed from a plurality of measured values and compared with a measured value or mean value of a plurality of measured values of the respective other work step sequence. The difference between the (mean) values determined in each case by the two work step sequences is then the correction value which must always be added to the measured values from future dynamic weighing processes in order to determine the actual weight of the weighed product as precisely as possible. Said correction value is preferably stored by the control device. In this case, it is preferable when the described calibration is performed for compensating the static-dynamic offset for different weights or weight ranges and corresponding different correction values are determined and stored in a database of the control device. Additionally or alternatively, different correction values for different packaging forms (different length and/or width and/or height and/or outer contour), for different packaging contents (differentiation according to solid or liquid) or for different transport speeds can be determined and stored in this way. In particular, to determine a correction value for a particular product, not only a single package (unit) is exemplarily weighed, but rather a representative selection of packages (units) of the same product.

According to a further embodiment of the weighing device according to the invention, it is provided that the control device is configured such that the first work step sequence (dynamic weighing process) and/or the second work step sequence (static weighing process) can be automatically run through several times. In other words, the control device effects a plurality of successive static weighing processes and/or a plurality of successive dynamic weighing processes. For example, the first work step sequence in which dynamic weighing is performed is run through 2 times to 40 times, preferably 10 times to 30 times, more preferably 15 times to 25 times. In particular, the second work step sequence, in which static weighing is performed, is run through less often than the first work step sequence, for example 2 times to 10 times, preferably 2 times to 5 times, particularly preferably 2 times to 3 times. The number of weighing processes can be fixed. However, it is also conceivable that the number of weighing processes is variable and in particular is adjustable by the control device as a function of the spread of the measured values (standard deviation), optionally linked to the error limits of the weighing device, or is adjustable manually.

According to a further embodiment of the weighing device according to the invention, this further has at least one movable guide element, preferably two movable guide elements, wherein the respective guide element is movable between a projecting position in which the guide element in particular adjoins the conveyor region in sections or at least partially protrudes into the conveyor region in sections, and a lying-back position in which the guide element is in particular spaced from the conveyor region, that is, lying outside of the conveyor region. "Projecting" means that the guide element is arranged closer to the belt centre or conveying device centre than in the lying-back position. The movement between the projecting and the lying-back position can also respectively be performed automatically, in particular controlled by the control device of the weighing device. The respective guide element is in particular arranged such that the product is guided past the guide element along the conveying region. In other words, the respective guide element is arranged along a section of the conveying region which lies between the start position and the destination position, in particular between the start position and the weighing section in which the respective product is weighed. The respective guide element can also protrude in sections into the weighing section.

A corresponding guide element makes it possible to align the product in a certain way while it moves on the conveyor region from the start position in the direction of the destination position. In this way, it is ensured that the product is always arranged in the same manner on the conveying device even when passing through the conveyor region multiple times from the start position in the direction of the destination position, thereby ensuring that the product is always transported away in the same orientation on the scale or over the scale. This in turn minimizes the risk of deviations between individual measurement results and allows a more accurate and faster determination of a mean value of a dynamic weighing process on the one hand and a static weighing process on the other hand.

In this context, according to yet another embodiment of the weighing device according to the invention, it is provided that the control device is configured such that the guide element during operation of the conveying device is arranged in the direction from the start position to the destination position in the projecting position and/or during operation of the conveying device is arranged in the direction from the destination position to the start position in the lying-back position. In other words, it is possible to move the respective guide element or, in the presence of two guide elements, both guide elements into a lying-back position outside the conveyor region when the product is conveyed back to the start position again after the weighing process. By arranging the guide element(s) outside the conveying region when the product is moved back to the start position, there is no risk of the product coming into contact with a guide element and, in the worst case, being displaced to another position. When the product is moved back to the start position, the orientation of the product remains unchanged or at least largely unchanged.

Before the product is then moved again from the start position in the direction of the weighing section, the respective guide element is preferably moved back again into the projecting position to ensure that the product is aligned as exactly as possible as in the previous measurement. However, the latter is not absolutely necessary, in particular not when the conveying device is moved back and forth relatively slowly with the overlying product. However, in order to temporally shorten the process of calibrating for static-dynamic compensation, it may also be desirable to move the product and thus the conveying device back and forth as quickly as possible. It can happen, under certain circumstances, that the product slightly slips when returning to the start position and with the subsequent direction of movement reversal, wherein however, the position is then corrected again by the guide elements, which are then in the projecting position again.

According to a further embodiment of the weighing device according to the invention, the conveying device is a belt conveyor or a roller conveyor. The term "belt conveyor", in addition to band conveyors, is also understood to mean strap and chain conveyors and plate belt conveyors and chain link conveyors. The belt conveying device can in turn consist of one or more successive individual belts in the transport direction, wherein the scale can be integrated in one of the conveyor belts or be placed between two conveyor belts. In particular, a roller conveyor has a plurality of rollers, wherein the scale is then preferably arranged between two adjacent rollers. A combination of belt and roller conveyor is conceivable, wherein the scale is preferably arranged between the belt and the roller conveyor.

Further, according to yet another embodiment of the weighing device according to the invention, it is provided that the weighing device further has a label applying device, which in particular has a printer, wherein the conveying region passes by the label applying device from the start position to the destination position or ends. After calibration is performed to compensate for the static-dynamic offset, the regular operation of the weighing device can then commence, in that for example individual products are weighed dynamically one after the other and each provided with a label containing a piece of product information corresponding to the measurement result.

The object is also further achieved according to a second teaching of the present invention by a method for weighing a product, in particular using a weighing device as defined above, in which the following steps are performed successively in the stated order:
a) placing a product on a conveying device in a start position,
b) operating the conveying device (in a first direction) so that the product is conveyed in the direction from the start position to a destination position along a conveyor region,
c) weighing the product when the product is located in a weighing section on or above a scale, wherein the weighing section lies on the conveying region between the start position and the destination position,
d) operating the conveying device (in a second direction) so that the product is conveyed in the direction from the destination position to the start position,
e) stopping the conveying device when the product is no longer located in the weighing section and in particular when the product is located back in the start position.

In other words, in particular for the purpose of calibrating a weighing device to compensate for a static-dynamic offset, in the method according to the invention, a product or test material is conveyed in the direction from a start position to a destination position and in the process weighed. The weighing process in this case is performed statically or dynamically. Subsequently, the product is again transported in the direction of the start position, that is, in the opposite direction. Then the product can be conveyed again in the direction from the start position to the destination position and a new weighing process can thereby be performed.

According to one embodiment of the method according to the invention, the conveying device for weighing the product, in particular automatically, is stopped (static weighing process) or continues to operate during the weighing of the product (dynamic weighing process).

As also already explained above, it is preferred when the sequence of steps from steps b) to e) is run through several times in succession, in particular automatically. The repetition allows the calculation of a mean value from several measured values, further the calculation of a correction value and, in turn, in the later regular operation of the weighing device, the most accurate determination of the actual weight of the product.

In particular, it is provided in the method according to the invention that the mean value of the measured values, which have been determined when weighing the product in the stopped state of the conveying device, is compared with the mean of the measured values which were determined when weighing the product during operation, that is, during the movement of the conveying device. In the case in which only a single static measurement or only a single dynamic measurement is performed for the calibration process, the individual measured value is understood to mean a mean value in the context of the invention.

Finally, as has already been explained, a movable guide element is provided, which in particular is automatically moved between a projecting position and a lying-back position, preferably such that when moving the product in the direction from the start position to the destination position, the respective guide element is arranged in the projecting position and with reversed movement direction in the lying-back position.

Figure 2:
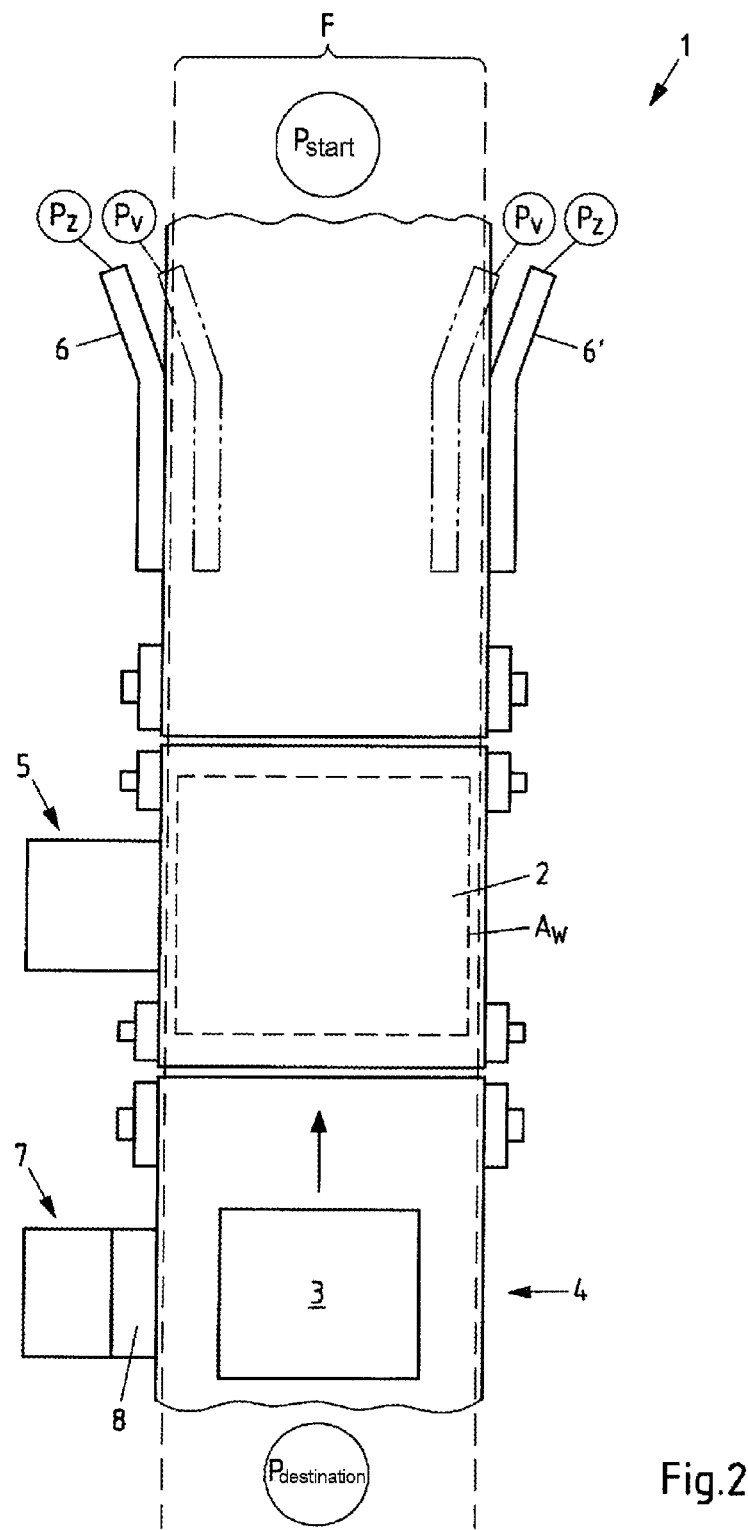
Figure 3:
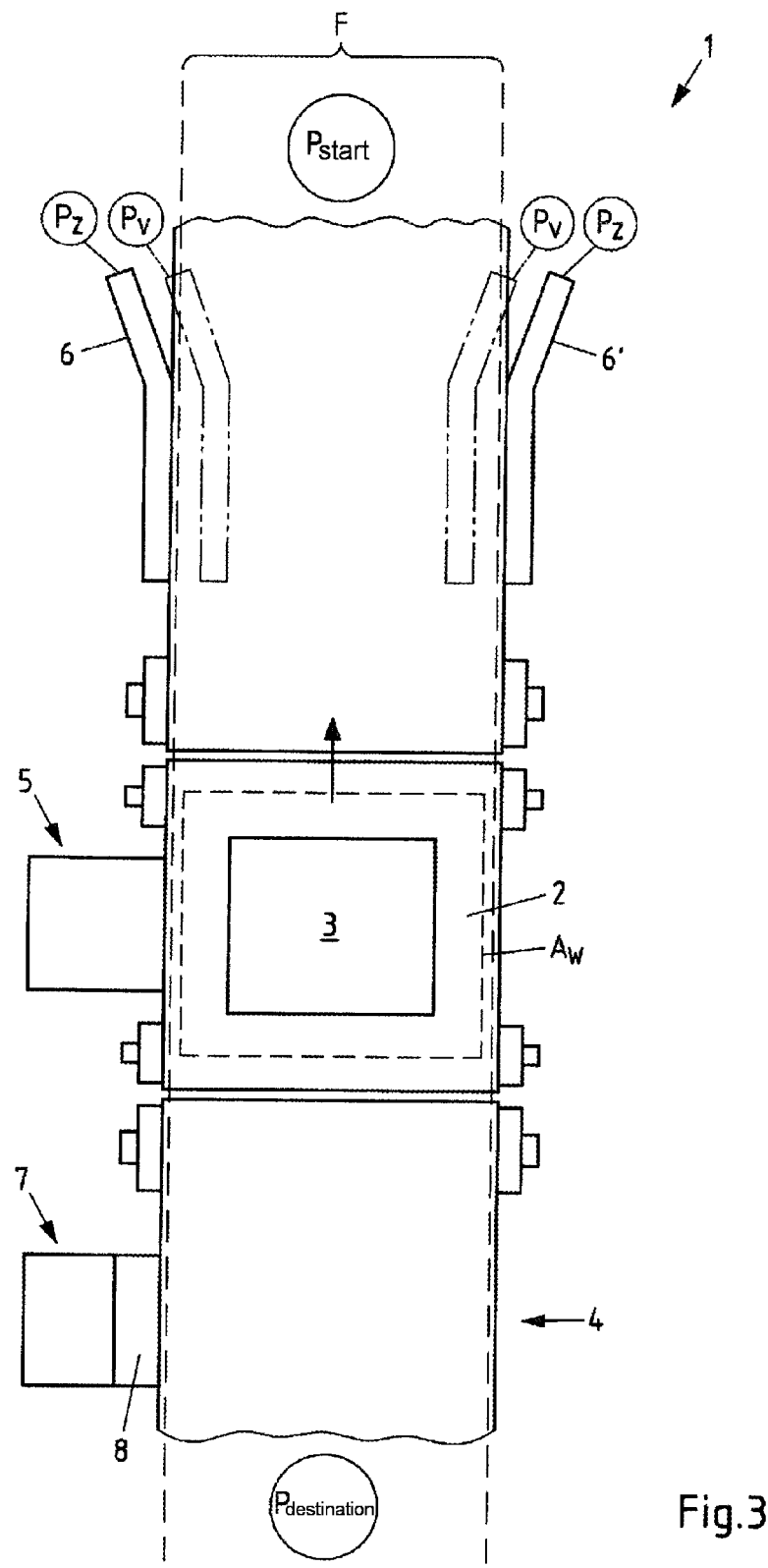

There is now a plurality of possibilities for designing and further developing the weighing device according to the invention and the method according to the invention for weighing a product. In this regard, reference is made, on the one hand, to the claims subordinate to the independent claims 1 and 10, and, on the other hand, to the description of an embodiment in conjunction with the drawing. The drawing shows:

FIG. 1 a schematic view of a weighing device immediately after the start of a first or second work step sequence, FIG. 2 the weighing device of FIG. 1 in the further course of the performance of the first work step sequence and FIG. 3 the weighing device of FIG. 1 in the further course of the performance of the second work step sequence.

In FIG. 1, a weighing device 1 in the form of a price labelling device or a checkweigher is shown schematically in a plan view. The weighing device 1 has a scale 2 for weighing a product 3 in a weighing section $A_W$ and a conveying device 4 for transporting the product 3 along a conveying region F from a start position $P_{start}$ over the weighing section $A_W$ to a destination position $P_{destination}$.

In the present case, the conveying device 4 is a multi-part belt conveyor, wherein the scale 2 is integrated into a middle section of the multi-part belt conveyor.

The weighing device 1 further has a control device 5 which controls, among other things, the conveying device 4, in particular the speed and running direction of the conveying device 4. The control occurs time-dependent and/or path-dependent and/or taking into account position data of the respective moving product. The position data can be determined, for example, by an optical system (not shown) connected to the control device 5, for example, with a camera or light barrier.

In addition, the weighing device 1 has two movable guide elements 6 and 6', which are arranged along a section of the conveying region F which lies between the start position $P_{start}$ and the weighing section $A_W$. The guide elements 6 and 6' can each, in particular independently or simultaneously, be moved between a projecting position $P_V$ and a lying-back position $P_Z$. The projecting position $P_V$ is shown in FIG. 1 and the lying-back position $P_Z$ in FIGS. 2 and 3. As can be clearly seen when FIG. 1 is compared with FIGS. 2 and 3, the guide elements 6 and 6' protrude at least in sections into the conveying region F in the projecting position $P_V$, whereas the two guide elements 6 and 6' lie outside the conveying region F in the lying-back position $P_Z$.

Finally, the weighing device 1 also has a label applying device 7 with a printer 8, which is arranged so that a product 3 can be passed by the label applying device 7 on the conveyor region F from the start position $P_{start}$ to the destination position $P_{destination}$ and/or can be provided with a label. In this way, after calibration of the weighing device 1 according to the invention is performed, which is described below, a price labelling process can be performed, in which a plurality of products 3 are weighed by the scale 2 successively in motion and the respective measurement result is taken into account when printing the label associated with the product 3.

The calibration process for the compensation of the static-dynamic offset is now described in more detail below.

Thus, the control device 5 is configured such that the conveying device 4, in the present case thus the belt conveyor or the at least one transport belt, can be automatically stopped during operation in a direction from the start position $P_{start}$ to the destination position $P_{destination}$ and then automatically operated in a direction from the destination position $P_{destination}$ to the start position $P_{start}$, thus in the reverse direction. The control device 5 makes it possible in this case to automatically perform a dynamic weighing process by means of the scale 2 in a first work step sequence during the operation of the conveying device in the direction from the start position $P_{start}$ to the destination position $P_{destination}$.

In addition, the control device 5 allows a static weighing process to be performed by means of the scale 2 in another work step sequence, when the conveying device 4 is stopped.

In this case, both the first work step sequence and the second work step sequence can be run through automatically a plurality of times to obtain a plurality of measurement results, from which a mean value is then formed in each case.

FIG. 1 shows how, at the beginning of one of the two work step sequences, the product 3 is conveyed from the start position $P_{start}$ in the direction of the weighing section $A_W$ and the destination position $P_{destination}$. The product 3 in the illustrated state is still located in a first section of the conveying device 4, wherein said guide elements 6 and 6' are arranged laterally along this section. The guide elements 6 and 6' are located here in the position $P_V$ projecting into the belt centre, in which the guide elements 6 and 6' touch the product 3 and can thereby align.

The product 3 is conveyed further from the position shown in FIG. 1 to the weighing section $A_W$ and weighed there either dynamically (at the end of the first work step sequence, see FIG. 2) or statically (at the end of the second work step sequence, see FIG. 3).

In the case of a dynamic weighing process, the product 3 is conveyed over the scale 2 and weighed in the time period in which the product is located vertically over the scale 2. In this case, the product 3 is then, as shown in FIG. 2, transported back again in a direction from the destination position $P_{destination}$ to the start position $P_{start}$ by reversing the direction of rotation of the conveying device 4 until it has left the weighing section $A_W$ and in particular has arrived again in the start position $P_{start}$. This dynamic weighing process can be repeated several times, wherein the product 3 is weighed, in particular, at the same speed and/or orientation as in the respective preceding weighing process.

In FIG. 3, finally, a part of the second work step sequence is shown, namely the static weighing process. In the second work step sequence, the product 3 is placed by the conveying device 4 exactly vertically over the scale 2 and the conveying device 4 is stopped in this position. The product 3 is then weighed at standstill. Subsequently, the product 3, as shown in FIG. 3, is also transported back by reversing the direction of rotation of the conveying device 4 until it has left the weighing section $A_W$ and in particular has again arrived in the start position $P_{start}$. This static weighing process can also be repeated a plurality of times, wherein the product 3 is fed to the weighing section $A_W$, in particular at the same speed and/or orientation as in the respective preceding weighing process. If necessary, however, even a single static weighing process can suffice for the purpose of calibration. In principle, it is also conceivable in the proposed weighing device 1 or the proposed method to manually enter/store the static weight value after the (static) weight has been determined by means of a checkweigher.

When the product 3 is moved back in the direction from the destination position $P_{destination}$ to the start position $P_{start}$, the two movable guide elements 6 and 6' are moved into the lying-back position $P_Z$ shown in FIGS. 2 and 3, so that the product 3, when passing the guide elements 6 and 6', can not come into contact with them. Before the first or second work step sequence is run through again, the guide elements 6 and 6' are moved again into the projecting position $P_V$ according to FIG. 1. This is done automatically by the control device 5.

Finally, the invention will be explained in more detail with reference to the following exemplary method sequence, in which the following step is first performed, in particular by an operator or automatically by the control device 5 using a feed device (not shown):

a) placing a product 3 on a conveying device 4 in a start position $P_{start}$, Thereafter, the control device 5 allows the weighing device 1 to perform the following steps in the order indicated:

b) operating the conveying device 4 such that the product 3 is conveyed in the direction from the start position $P_{start}$ to a destination position $P_{destination}$ along a conveyor region F and past two projecting guide elements 6 and 6' which align the product 3, c) weighing the product 3 when the product 3 is located in a weighing section $A_W$ over a scale 2, wherein the weighing section $A_W$ lies on the conveying region F between the start position $P_{start}$ and the destination position $P_{destination}$, wherein according to a first work step sequence, the conveying device 4 continues running during weighing of the product 3 and is stopped only after weighing or wherein according to an alternative work step sequence, the conveying device 4 is already stopped for weighing the product 3, d) operating (that is, restarting again) the conveying device 4, so that the product 3 is conveyed in the direction from the destination position $P_{destination}$ to the start position $P_{start}$, e) stopping the conveying device 4 after the product 3 has passed the retracted guide elements 6 and 6' partially or completely.

In order to obtain a plurality of measured values, the steps b) to e) are automatically run through a plurality of times in succession in each of the two work step sequences. A mean value for the dynamic measuring process and a mean value for the static measuring process are then determined in a further method step from the individual measured values. In yet a further method step, the mean values are compared with each other and the difference is stored as a correction value for the static-dynamic compensation.

In the later regular weighing method, that is, after calibration of the weighing device, in which a plurality of products 3 are weighed dynamically in succession, the previously determined correction value is then added to each measurement result in order to decide on the actual weight.

The invention claimed is:

1. A weighing device comprising:
   a scale for weighing a product in a weighing section;
   a conveying device for transporting the product along a conveying region from a start position over the weighing section to a destination position; and
   a control device configured to automatically stop the conveying device during its operation in a direction from the start position to the destination position to achieve a stopped state, and then to automatically operate the conveying device in a reverse movement direction from the destination position to the start position until the product is no longer located in the weighing section.

2. The weighing device according to claim 1, wherein the control device is configured such that in a first work step sequence, a weighing process is automatically performed by means of the scale during operation of the conveying device in the direction from the start position to the destination position.

3. The weighing device according to claim 2, wherein the control device is configured such that in a second work step sequence which follows or precedes the first work step sequence, a weighing process is performed automatically by means of the scale in the stopped state of the conveying device after stopping the operation of the conveying device in the direction from the start position to the destination position, and wherein the conveying device is then automatically operated in the reverse movement direction from the destination position to the start position.

4. The weighing device according to claim 3, wherein the control device is configured such that the first work step sequence and/or the second work step sequence is run through automatically a plurality of times.

5. The weighing device according to claim 1, wherein the weighing device further comprises at least one movable guide element which is movable between a projecting position in which the guide element adjoins the conveyor region at least in sections or at least protrudes into the conveyor region in sections, and a lying-back position in which the guide element is spaced from the conveyor region.

6. The weighing device according to claim 5, wherein the guide element is arranged such that the product is passed by the guide element along the conveying region.

7. The weighing device according to claim 5, wherein the control device is configured such that the guide element is arranged in the projecting position during operation of the conveying device in the direction from the start position to the destination position and/or in the lying-back position during operation of the conveying device in the reverse movement direction from the destination position to the start position.

8. The weighing device according to claim 1, wherein the conveying device is a belt conveyor or a roller conveyor.

9. The weighing device according to claim 1, wherein the weighing device further comprises a label applying device, which includes a printer, and wherein the conveying region passes by the label applying device from the start position to the destination position.

10. A method for weighing a product using a weighing device according to claim 1, the method comprising the following steps performed successively in the stated order
    a) placing the product on the conveying device in the start position;
    b) operating the conveying device so that the product is conveyed in the direction from the start position to the destination position along the conveying region;
    c) weighing the product when the product is located in the weighing section over the scale, wherein the weighing section lies on the conveying region between the start position and the destination position;
    d) operating the conveying device so that the product is conveyed in the reverse movement direction from the destination position to the start position; and
    e) stopping the conveying device when the product is no longer located in the weighing section.

11. The method according to claim 10, wherein the conveying device is stopped for weighing the product automatically.

12. The method according to claim 10, wherein the conveying device is further operated during the weighing of the product.

13. The method according to claim 10, wherein steps b) to e) are run through in succession a plurality of times automatically.

14. The method according to claim 13, wherein a respective mean value is formed from stopped state measured values obtained in step c), which stopped state measured values were obtained during weighing of the product in a stopped state of the conveying device, and operation measured values obtained in step c), which operation measured values were obtained during weighing of the product during operation of the conveying device.

15. The method according to claim 14, wherein the mean value of the stopped state measured values which were obtained during weighing of the product in the stopped state of the conveying device is compared with the mean value of the operation measured values which were obtained during weighing of the product during operation of the conveying device.

16. The method according to claim 10, wherein in step b), a movable guide element adjoins the conveying region in a projecting position or at least protrudes in sections into the conveying region such that as the product passes by the guide element on the conveying device the product comes into contact with the guide element and/or is aligned by the guide element.

17. The method according to claim 16, wherein in step d), the movable guide element lies outside of the conveyor region in a lying-back position such that as the product passes by the guide element on the conveying device the product does not come into contact with the guide element.

18. The method according to claim 17, wherein the movable guide element in or before step b), is automatically moved in the projecting position and/or in or before step d), is automatically moved in the lying-back position.

* * * * *